(12) United States Patent
van der Mee et al.

(10) Patent No.: US 8,841,366 B2
(45) Date of Patent: Sep. 23, 2014

(54) THERMOPLASTIC POLYCARBONATE COPOLYMER COMPOSITIONS, METHODS OF THEIR MANUFACTURE, AND USES THEREOF

(71) Applicant: SABIC Innovative Plastics IP B. V., Bergen op Zoom (NL)

(72) Inventors: Mark Adrianus Johannes van der Mee, Breda (NL); Robert Dirk van de Grampel, Tholen (NL); Roland Sebastian Assink, Middelburg (NL); Paul Dean Sybert, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/780,324

(22) Filed: Feb. 28, 2013

(65) Prior Publication Data

US 2013/0224460 A1    Aug. 29, 2013

Related U.S. Application Data

(60) Provisional application No. 61/604,845, filed on Feb. 29, 2012.

(51) Int. Cl.
*C08K 5/523*  (2006.01)
*C09K 21/14*  (2006.01)
*B32B 5/00*   (2006.01)

(52) U.S. Cl.
CPC . *C09K 21/14* (2013.01); *B32B 5/00* (2013.01); *C08K 5/523* (2013.01)
USPC ........... 524/127; 524/123; 524/126; 524/128; 524/129; 524/130; 524/133; 524/138; 524/140; 524/141; 524/147; 524/153; 524/154

(58) Field of Classification Search
USPC ......... 524/123, 126, 127, 128, 129, 130, 133, 524/138, 140, 141, 147, 153, 154
See application file for complete search history.

(56) References Cited

U.S. PATENT DOCUMENTS

| | | | |
|---|---|---|---|
| 7,767,738 B2 | 8/2010 | Gaggar et al. | |
| 2005/0187372 A1 | 8/2005 | Venderbosch et al. | |
| 2005/0228137 A1 | 10/2005 | Srinivasan et al. | |
| 2007/0142535 A1 | 6/2007 | Wenz et al. | |
| 2008/0081884 A1* | 4/2008 | Glasgow et al. | 525/464 |
| 2008/0119619 A1* | 5/2008 | Mullen | 525/461 |
| 2009/0105443 A1* | 4/2009 | Brack et al. | 528/190 |
| 2010/0152344 A1* | 6/2010 | Van den Bogerd et al. | 524/141 |

OTHER PUBLICATIONS

Lin et al., "Polymers with Improved Flammability Characteristics. I.Phenolphthalein-Related Homopolymers", Journal of Polymer Science: Polymer Chemistry Edition, vol. 19, pp. 2659-2670, 1981 XP009050158.
International Search Report for International Application No. PCT/US2013/028316, International Application Filing Date: Feb. 28, 2013; Date of Mailing: Jun. 7, 2013, 5 pages.
Written Opinion for International Application No. PCT/US2013/028316, International Application Filing Date: Feb. 28, 2013; Date of Mailing: Jun. 7, 2013, 6 pages.

* cited by examiner

*Primary Examiner* — Peter Szekely
(74) *Attorney, Agent, or Firm* — Cantor Colburn LLP

(57) ABSTRACT

This disclosure relates to thermoplastic compositions comprising a polycarbonate copolymer, the polycarbonate copolymer comprising first repeating carbonate units and second repeating units selected from carbonate units that are different from the first carbonate units, polysiloxane units, and a combination comprising at least one of the foregoing unit; and an organophosphorus flame retardant in an amount effective to provide 0.1 to 1.0 wt % phosphorus based on the total weight of the composition, wherein an article molded from the composition has a smoke density after 4 minutes (Ds-4) of less than or equal to 600 determined according to ISO 5659-2 on a 3 mm thick plaque, and a material heat release of less than or equal to 160 kW/m² determined according to ISO 5660-1 on a 3 mm thick plaque.

25 Claims, No Drawings

THERMOPLASTIC POLYCARBONATE COPOLYMER COMPOSITIONS, METHODS OF THEIR MANUFACTURE, AND USES THEREOF

CROSS-REFERENCE TO RELATED APPLICATIONS

This application claims the benefit of U.S. Patent Application No. 61/604,845, filed Feb. 29, 2012, which is incorporated by reference in its entirety herein.

BACKGROUND

This disclosure is directed to flame retardant thermoplastic compositions comprising polycarbonate, their method of manufacture, and methods of use thereof and in particular to thermoplastic polycarbonate copolymer compositions having low smoke density and low heat release.

Polycarbonates are useful in a wide variety of applications at least in part because of their good balance of properties, such as moldability, heat resistance and impact properties among others. However, standards for flame retardancy properties such as flame spread, heat release, and smoke generation upon burning have become increasingly stringent, particularly in applications used in mass transportation (aircraft, trains, and ships), as well as building and construction. For example, the European Union has approved the introduction of a new harmonized fire standard for rail applications, namely EN-45545, to replace all currently active different standards in each member state. This standard will impose stringent requirements on heat release and smoke density properties allowed for materials used in these applications. Smoke density (Ds-4) in EN-45545 is the smoke density after four minutes determined in accordance with ISO 5659-2, and heat release in EN-45545 is the maximum average rate of heat emission (MAHRE) determined in accordance with ISO 5660-1.

It is exceptionally challenging to develop materials that meet stringent smoke density standards and heat release standards in addition to other material requirements. It is particularly challenging to develop materials that meet these standards and that have good mechanical properties (especially impact/scratch resistance) and processability. Accordingly there remains a need for thermoplastic compositions that have a combination of low smoke and low heat release properties. It would be a further advantage the compositions could be rendered low smoke and low heat release without a significant detrimental effect on one or more of material cost, processability, and mechanical properties. It would be a still further advantage if the materials could be readily thermoformed or injection molded. It would be a still further advantage if such materials were in compliance with European Railway standard EN-45545, for example, without having a detrimental effect on material cost, processability, and mechanical properties.

SUMMARY

Disclosed herein is a thermoplastic composition comprising a polycarbonate copolymer, comprising first repeating carbonate units and second repeating units selected from carbonate units that are different from the first carbonate units, polysiloxane units, and a combination comprising at least one of the foregoing unit; and an organophosphorus flame retardant in an amount effective to provide 0.1 to 1.0 wt % phosphorus based on the total weight of the composition, wherein an article molded from the composition has a smoke density after 4 minutes (Ds-4) of less than or equal to 600 determined according to ISO 5659-2 on a 3 mm thick plaque, and a material heat release of less than or equal to 160 kW/m$^2$ determined according to ISO 5660-1 on a 3 mm thick plaque.

A method of manufacture of the thermoplastic compositions comprises extruding or melt-blending the components of the thermoplastic compositions to form the thermoplastic compositions.

In yet another embodiment, an article comprises the thermoplastic compositions, including a molded article, a thermoformed article, an extruded film, an extruded sheet, a foamed article, a layer of a multi-layer article, a substrate for a coated article, or a substrate for a metalized article. The article can be a transportation component, for example a component of a train, a floor for a train compartment, a train compartment, cladding, or seating for a train.

A method of manufacture of an article comprises molding, extruding, foaming, or casting the above-described thermoplastic composition to form the article.

The above described and other features are exemplified by the following Detailed Description, Examples, and Claims.

DETAILED DESCRIPTION

The inventors hereof have discovered that thermoplastic compositions having low smoke density as well as lower heat release can unexpectedly be obtained by combining certain polycarbonate copolymers with a relatively small amount of organophosphorus compounds. In particular, the inventors have discovered that the combination of the small amounts of organophosphorus compounds with specific polycarbonate copolymers results in a decrease in the smoke density (Ds-4) of the copolymers as determined in accordance with ISO 5659-2, in addition to decreasing the material heat release values as determined in accordance with ISO 5660-1. For example, the thermoplastic composition can have a smoke density of less than 600 as determined in accordance with ISO 5659-2 on a 3 mm thick plaque. The thermoplastic compositions can further have a maximum average rate of heat emission ("MAHRE") of less than 160 kW/m$^2$, as determined in accordance with ISO 5660-1 on a 3 mm thick plaque.

In particular, the thermoplastic compositions contain a polycarbonate copolymer comprising first repeating carbonate units and second repeating units that are different from the first carbonate units. The first carbonate units are bisphenol carbonate units that can be derived from a bisphenol-A compound. The second repeating units can be repeating carbonate units different from the first carbonate units; siloxane units; or a combination comprising at least one of the foregoing types of units. The thermoplastic compositions further contain a organophosphorus compound, effective to provide 0.1-1.0%, 0.3 to 0.8%, or 0.5 to 0.7% based on the weight of the composition, of phosphorus, whereby an article formed from the composition has a smoke density of less than 600 as determined in accordance with ISO 5659-2 on a 3 mm thick plaque and MAHRE of less than 160 kW/m$^2$ as determined in accordance with ISO 5660-1 on a 3 mm thick plaque.

Without being bound by theory, it is believed that the unexpected combination of low smoke density and low heat release values are obtained by careful selection and balancing of the relative amounts and ratios of the first and second repeating units of the polycarbonate copolymer, including the block size of the first and second repeating units in the polycarbonate copolymer, the total amount of siloxane units in the composition when present, and the total amount and choice of the organophosphorus compounds used in the composition.

The polycarbonate copolymers have first repeating first units that are bisphenol carbonate units of formula (1)

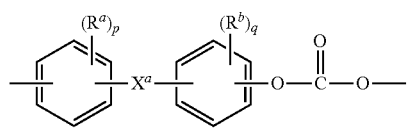
(1)

wherein $R^a$ and $R^b$ are each independently $C_{1-12}$ alkyl, p and q are each independently 0 to 4, and $X^a$ is a bridging group between the two arylene groups, and is a single bond, —O—, —S—, —S(O)—, —S(O)$_2$—, —C(O)—, a $C_{1-12}$ alkylidene of formula —C($R^c$)($R^d$)— wherein $R^c$ and $R^d$ are each independently hydrogen or $C_{1-11}$ alkyl, or a group of the formula —C(=Re)— wherein $R^c$ is a divalent $C_{1-11}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In another embodiment, p and q is each 1, and $R^a$ and $R^b$ are each a $C_{1-3}$ alkyl group, specifically methyl, disposed meta to the oxygen on each ring. The bisphenol carbonate units (1) can be derived from bisphenol-A, where p and q are both 0 and $X^a$ is isopropylidene.

The polycarbonate units in the copolymers can be produced from dihydroxy compounds of formula (2)

HO—R$^1$—OH    (2)

wherein $R^1$ is a bridging moiety. Thus, the bisphenol carbonate units (1) are generally produced from the corresponding bisphenol compounds of formula (3)

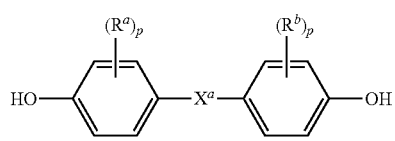
(3)

wherein $R^a$ and $R^b$, p and q, and $X^a$ are the same as in formula (1).

Some illustrative examples of specific bisphenol compounds (3) that can be used include 4,4'-dihydroxybiphenyl, bis(4-hydroxyphenyl) methane, 1,2-bis(4-hydroxyphenyl) ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, bis(4-hydroxyphenyl)ether, bis(4-hydroxyphenyl) sulfide, bis(4-hydroxyphenyl)sulfoxide, bis(4-hydroxyphenyl)sulfone, 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, or a combination comprising at least one of the foregoing bisphenolic compounds.

As stated above, the polycarbonate copolymers further comprise second repeating units. The second repeating units can be bisphenol carbonate units (provided that they are different from the bisphenol carbonate units (1)), siloxane units, or a combination comprising at least one of the foregoing.

In an embodiment, the second units are repeating bisphenol carbonate units of formula (4)

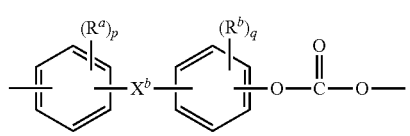
(4)

wherein $R^a$ and $R^b$ are each independently $C_{1-12}$ alkyl, p and q are each independently integers of 0 to 4, and $X^b$ is $C_{1-32}$ bridging hydrocarbon group that is not the same as the $X^a$ in carbonate units (1). The bridging group $X^b$ and the carbonate oxygen atoms of each $C_6$ arylene group can be disposed ortho, meta, or para (specifically para) to each other on the $C_6$ arylene group.

In an embodiment, $X^b$ in formula (4) is a substituted or unsubstituted $C_{5-32}$ alkylidene of formula —C(Re)($R^d$)— wherein $R_c$ and $R^d$ are each independently hydrogen, $C_{4-12}$ cycloalkyl, $C_{6-12}$ aryl, $C_{7-12}$ arylalkylene, $C_{1-12}$ heteroalkyl, a substituted or unsubstituted group of the formula —C(=Re)— wherein $R^e$ is a divalent $C_{12-31}$ hydrocarbyl, a substituted or unsubstituted $C_{5-18}$ cycloalkylidene, a substituted or unsubstituted $C_{5-18}$ cycloalkylene, a substituted or unsubstituted $C_{3-18}$ heterocycloalkylidene, or a group of the formula —B$^1$-G-B$^2$— wherein B$^1$ and B$^2$ are the same or different $C_{1-6}$ alkylene group and G is a $C_{3-12}$ cycloalkylidene group or a $C_{6-16}$ arylene group.

For example, $X^b$ in formula (4) can be a substituted $C_{3-18}$ heterocycloalkylidene of formula (5)

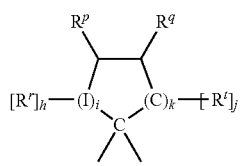
(5)

wherein $R^r$, $R^p$, $R^q$, and $R^t$ are each independently hydrogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (3) will have an unsaturated carbon-carbon linkage where the ring is fused. When k is one and i is 0, the ring as shown in formula (5) contains 4 carbon atoms, when k is 2, the ring contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Specific second bisphenol carbonate repeating units of this type are phthalimidine carbonate units of formula (6)

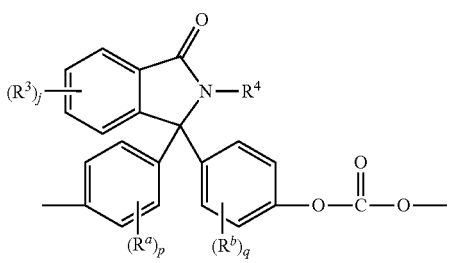

(6)

wherein $R^a$, $R^b$, p, and q are as in formula (4), $R^3$ is each independently a $C_{1-6}$ alkyl group, j is 0 to 4, and $R_4$ is hydrogen, $C_{1-6}$ alkyl, phenyl optionally substituted with 1 to 5 $C_{1-6}$ alkyl groups. In particular, the phthalimidine carbonate units are of formula (6a)

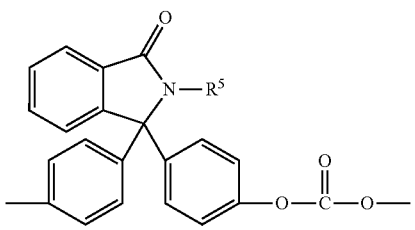

(6a)

wherein $R^5$ is hydrogen, $C_{1-6}$ alkyl, or phenyl optionally substituted with 1 to 5 $C_{1-6}$ alkyl groups. In an embodiment, $R^5$ is hydrogen, phenyl or methyl. Carbonate units (6a) wherein $R^5$ is phenyl can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (6b) and (6c)

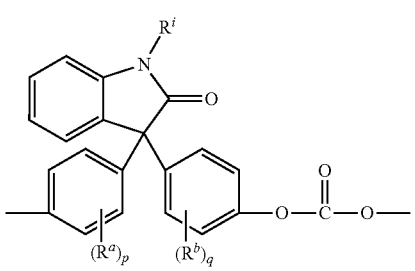

(6b)

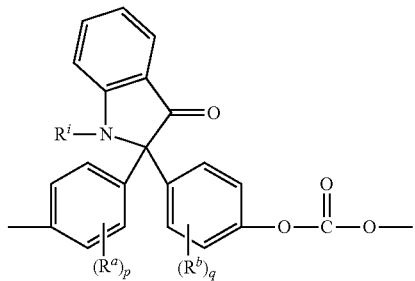

(6c)

wherein $R^a$ and $R^b$ are each independently $C_{1-12}$ alkyl, p and q are each independently 0 to 4, and $R^i$ is $C_{1-12}$ alkyl, phenyl, optionally substituted with 1 to 5 $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Examples of bisphenol carbonate units (4) wherein $X^b$ is a substituted or unsubstituted $C_{3-18}$ cycloalkylidene include the cyclohexylidene-bridged, alkyl-substituted bisphenol of formula (7)

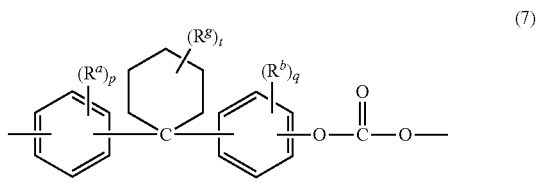

(7)

wherein $R^a$ and $R^b$ are each independently $C_{1-12}$ alkyl, $R^g$ g is $C_{1-12}$ alkyl, p and q are each independently 1 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0.

Examples of other bisphenol carbonate units (4) wherein $X^b$ is a substituted or unsubstituted $C_{3-18}$ cycloalkylidene include adamantyl units (8) and units (9)

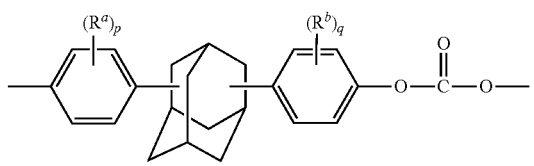

(8)

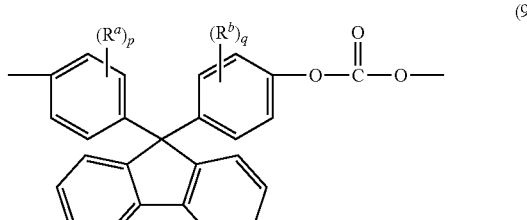

(9)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (6a-c), (7), (8), and (9) are useful for making polycarbonate polymers with high glass transition temperatures (Tg) and high heat distortion temperatures.

Bisphenol carbonate units (4) are generally produced from the corresponding bisphenol compounds of formula (10)

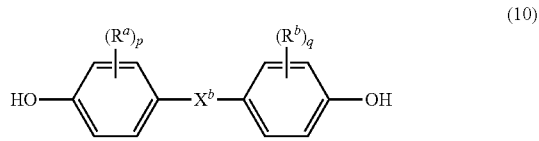

(10)

wherein $R^a$, $R^b$, p, q, and $X^b$ are the same as in formula (4). Specific examples of bisphenol compounds of formula (10) include bis(4-hydroxyphenyl)diphenylmethane, 1,1-bis(4-hydroxy-t-butylphenyl) propane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathiin, 2,7-dihydroxy-9,10-dimethylphenazine, 3,6-dihydroxydibenzofuran, 3,6-dihydroxydibenzothiophene, 2,7-dihydroxycarbazole, and 2,6-dihydroxythianthrene 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

The mole ratio of first bisphenol carbonate units (1) and second bisphenol carbonate units (4) can vary from 99:1 to 1:99, depending on the desired characteristics of the thermoplastic composition, including Ds-4 smoke density, MAHRE, glass transition temperature, impact strength, ductility, melt flow rate, and like considerations. For example, the mole ratio of units (1): units (4) can be from 90:10 to 10:90, from 80:20 to 20:80, from 70:30 to 30:70, or from 60:40 to 40:60. When repeating bisphenol carbonate units (1) are derived from bisphenol-A, the bisphenol-A units are generally present in an amount from 50 to 99 mole %, based on the total moles of units in the polycarbonate copolymer. For example, when bisphenol carbonate units (1) are derived from bisphenol-A, and bisphenol units (4) are derived from PPPBP, the mole ratio of units (1) to units (4) can be from 99:1 to 50:50, or from 90:10 to 55:45.

Other carbonate units can be present in any of the polycarbonate copolymers comprising units (1) and (4), in relatively small amounts, for example less than 20 mole %, less than 10 mole %, or less than 5 mole %, based on the total moles of units in the polycarbonate copolymer. The other carbonate units can be derived from $C_{1-32}$ aliphatic or $C_{6-32}$ aromatic dihydroxy compounds, for example resorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, catechol, hydroquinone, 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, and 2,3,5,6-tetra-t-butyl hydroquinone. In an embodiment no carbonate derived from aliphatic aromatic dihydroxy compounds are present. The polycarbonate copolymers comprising a combination of units (1) and (4) can have an intrinsic viscosity, as determined in chloroform at 25° C., of about 0.3 to about 1.5 deciliters per gram (dl/gm), specifically about 0.45 to about 1.0 dl/gm. The polycarbonate copolymers can have a weight average molecular weight ($M_w$) of about 10,000 to about 200,000 grams per mole (g/mole), specifically about 20,000 to about 100,000 g/mole, as determined by gel permeation chromatography (GPC), using a cross-linked styrene-divinylbenzene column and calibrated to polycarbonate references. GPC samples are prepared at a concentration of about 1 mg per ml, and are eluted at a flow rate of about 1.5 ml per minute.

In an embodiment, the polycarbonate copolymers comprising a combination of units (1) and (4) have flow properties useful for the manufacture of thin articles. Melt volume flow rate (often abbreviated MVR) measures the rate of extrusion of a thermoplastic melt through an orifice at a prescribed temperature and load. For example, the polycarbonate copolymers comprising a combination of units (1) and (4) can have an MVR measured at 300° C. under a load of 1.2 kg according to ASTM D1238-04, of 0.5 to 100 cubic centimeters per 10 minutes (cc/10 min), specifically 1 to 75 cc/10 min, and more specifically 1 to 50 cc/10 min.

Combinations of polycarbonate copolymers of different flow properties and weight average molecular weights can be used to achieve the overall desired flow property. It is desirable for such combinations to have an MVR measured at 300° C./1.2 kg load, of about 5 to about 150 cc/10 min., specifically about 7 to about 125 cc/10 min, more specifically about 9 to about 110 cc/10 min, and still more specifically about 10 to about 100 cc/10 minute. Polycarbonates useful for the formation of thin articles can have an MVR, measured at 300° C./1.2 kg load, of about 9 to about 21 cc/10 min, specifically about 9.4 to about 21.4 cc/10 min.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among tertiary amines that can be used are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X^-$, wherein each $R_3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include $(CH_3(CH_2)_3)_4N^+X^-$, $(CH_3(CH_2)_3)_4P^+X^-$, $(CH_3(CH_2)_5)_4N^+X^-$, $(CH_3(CH_2)_6)_4N^+X^-$, $(CH_3(CH_2)_4)_4N^+X^-$, and $CH_3(CH_3(CH_2)_2)_3N^+X^-$, wherein X is Cl$^-$, Br$^-$, a $C_{1-8}$ alkoxy group or a $C_{6-18}$ aryloxy group. An effective amount of a phase transfer catalyst can be 0.1 to 10 wt. %, or 0.5 to 2 wt. %, each based on the weight of bisphenol in the phosgenation mixture.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages the number average molecular weight (Mn) of the polycarbonate is increased to between about 8,000 and about 25,000 Daltons (using polycarbonate standard).

The term "melt polymerization conditions" is understood to mean those conditions necessary to effect reaction between a dihydroxy aromatic compound and a diaryl carbonate in the presence of a transesterification catalyst. Typically, solvents are not used in the process, and the reactants dihydroxy aromatic compound and the diaryl carbonate are in a molten state. The reaction temperature can be about 100° C. to about 350° C., specifically about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

The diaryl carbonate ester can be diphenyl carbonate, or an activated diphenyl carbonate having electron-withdrawing substituents on the aryl groups, such as bis(4-nitrophenyl) carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

Catalysts used in the melt polymerization of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of a non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1 \times 10^{-2}$ to $1 \times 10^{-8}$ moles, specifically, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, specifically $1 \times 10^{-3}$ to $1 \times 10^{-4}$ moles per total mole of the dihydroxy compounds in the reaction mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid.

The branching agents can be added at a level of about 0.05 to about 5 wt. %. Combinations comprising linear polycarbonates and branched polycarbonates can be used.

All types of polycarbonate end groups are contemplated as being useful in the polycarbonate composition, provided that such end groups do not significantly adversely affect desired properties of the compositions. A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p-and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Additionally, the polycarbonate copolymers can be prepared from polyester blocks. The polyester blocks can also be prepared by interfacial polymerization. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

All types of polycarbonate end groups are contemplated as being useful in the thermoplastic composition, provided that such end group does not significantly adversely affect desired properties of the compositions such as smoke density and maximum average rate of heat release, ductility, transparency and the like. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

In another embodiment, the second units of the polycarbonate copolymers are siloxane units. Such poly(carbonate-siloxane) (PC-siloxane or PC-Si)copolymers contain bisphenol carbonate units (1), for example bisphenol-A carbonate units, and repeating siloxane units (also known as "diorganosiloxane units"). The polysiloxane units are of formula (11)

(11)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof In an embodiment no halogens are present. Combinations of the foregoing R groups can be used in the same copolymer. In an embodiment, the polysiloxane comprises R groups that have minimal hydrocarbon content. In a specific embodiment, an R group with minimal hydrocarbon content is a methyl group.

The average value of E, denoting the siloxane-containing block size in formula (11), can vary widely depending on the type and relative amount of each component in the thermoplastic composition, whether the polymer is linear, branched or a graft copolymer, the desired properties of the composition (e.g. transparency), and like considerations. In an embodiment, E has an average value of 2 to 500, 5 to 200, or 5 to 100, 10 to 100, 10 to 80 or 3 to 60. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10.

In an embodiment, the polysiloxane units are structural units of formula (11a)

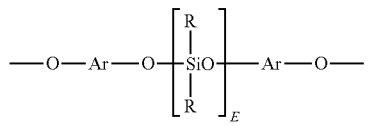
(11a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (11a) can be derived from a $C_{6-30}$ dihydroxy aromatic compound, for example a bisphenol compound as described above or monoaryl dihydroxy compound such as resorcinol for example. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydrobenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (11a-1)

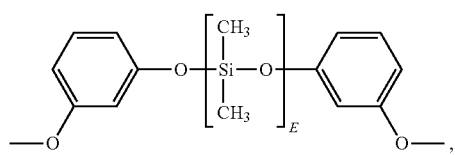
(11a-1)

or where Ar is derived from bisphenol-A, the polysiloxane has the formula (11a-2)

or a combination comprising at least one of the foregoing can be used, wherein E has an average value as described above, specifically an average value of 5 to 200.

In another embodiment, polydiorganosiloxane units are units of formula (11b)

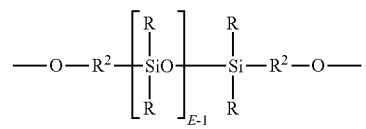
(11b)

wherein R and E are as described for formula (11), and each $R^2$ is independently a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (11b-1)

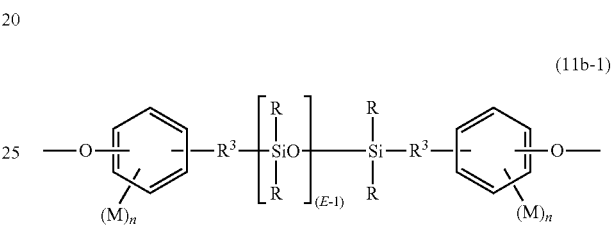
(11b-1)

wherein R and E are as defined for formula (11), and each $R^3$ is independently a divalent $C_{2-8}$ aliphatic group. Each M in formula (11b-1) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. For example, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

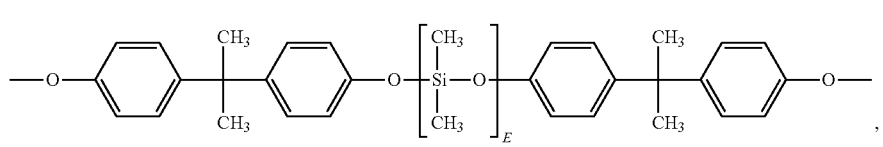
(11a-2)

In a specific embodiment, the polysiloxane units are of formula (11b-2)

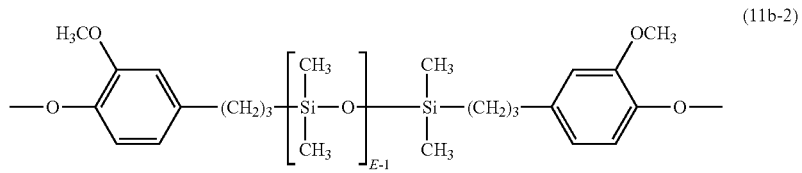

(11b-2)

where E has an average value as described above, specifically 5 to 80. In another specific embodiment, the polysiloxane units are of formula (11b-3)

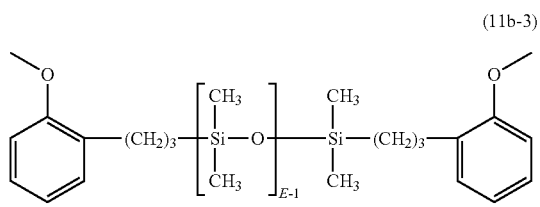

(11b-3)

where E has an average value as defined above, specifically an average value of 5 to 80.

The relative amount of carbonate units (1) and polysiloxane units (11) in the poly(carbonate-siloxane) copolymers depends on the desired properties of the thermoplastic compositions, such as transparency, impact resistance, smoke density, heat release, and melt viscosity. In particular the polycarbonate copolymer is selected to have an average value of E that provides good impact and/or transparency properties, as well as to provide the desired weight percent of siloxane units in the thermoplastic composition. For example, the polycarbonate copolymers can comprise siloxane units in an amount of 0.3 to 30 weight percent (wt %), specifically 0.5 to 25 wt %, or 0.5 to 15 wt %, based on the total weight of the polymers in the thermoplastic composition, with the proviso that the siloxane units are provided by polysiloxane units covalently bonded in the polymer backbone of the polycarbonate copolymer.

A specific poly(carbonate-siloxane) comprises first carbonate units (1) derived from bisphenol-A, and second repeating siloxane units (11b-2), (11b-3), or a combination thereof. This polycarbonate copolymer can comprise the siloxane units in an amount of 0.1 to 25 weight percent (wt %), 0.2 to 10 wt %, 0.2 to 6 wt % 0.2 to 5 wt %, or 0.25 to 2 wt %, based on the total weight of the polycarbonate copolymer, with the proviso that the siloxane units are covalently bound to the polymer backbone of the polycarbonate copolymer. For example, the siloxane units are present in an amount effective to provide 0.3 wt % to 10 wt %, 0.3 wt % to 8.0 wt %, 0.3 wt % to 7.5 wt %, 0.5 wt % to 7.5 wt %, 1.0 wt % to 6.0 wt % siloxane based on the weight of the composition. In an embodiment, the remaining units are bisphenol units (1).

Methods for the manufacture of the PC-siloxane copolymers are known. The poly(carbonate-siloxane) copolymers can have an intrinsic viscosity, as determined in chloroform at 25° C., of 0.3 to 1.5 deciliters per gram (dl/g), specifically 0.45 to 1.0 dl/g. The poly(carbonate-siloxane) can have an $M_w$ of 10,000 to 100,000 g/mol, as determined by gel permeation chromatography (GPC) using a cross linked styrene-divinyl benzene column, at a sample concentration of 1 milligram per milliliter, and as calibrated with polycarbonate standards.

Poly(siloxane) copolymers suitable for use can have an MVR, measured at 300° C. under a load of 1.2 kg according to ASTM D1238-04, of 0.5 to 80 cc/10 min. Also, the poly (siloxane) copolymers can have an intrinsic viscosity, as determined in chloroform at 25° C., of 0.3 to 1.5 dl/g, specifically 0.45 to 1.0 dl/g.

The low smoke density and low heat release thermoplastic compositions comprise the above-described polycarbonate copolymers and poly(carbonate-siloxane) copolymers in combination with an organophosphorus flame retardant in an amount effective to provide 0.1 to 1.0 wt % phosphorus, based on the weight of the composition. Such compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more non-aromatic moieties, for example alkyl, alkenyl, alkynyl, or cycloalkyl. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol-A), a monoarylene group (e.g., a 1,3-phenylene or a 1,4-phenylene), or a combination comprising at least one of the foregoing.

The phosphorus-containing group can be a phosphate $(P(\!=\!O)(OR)_3)$, phosphite $(P(OR)_3)$, phosphonate $(RP(\!=\!O)(OR)_2)$, phosphinate $(R_2P(\!=\!O)(OR))$, phosphine oxide $(R_3P(\!=\!O))$, or phosphine $(R_3P)$, wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P\!=\!O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis (neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2, 5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formula (12)

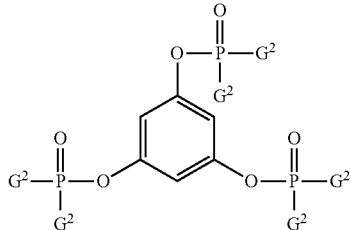

(12)

wherein each $G^2$ is independently a hydrocarbon or hydrocarbonoxy having 1 to 30 carbon atoms. In some embodiments G corresponds to a monomer used to form the polycarbonate, e.g., resorcinol.

Specific aromatic organophosphorus compounds have two or more phosphorus-containing groups, and are inclusive of acid esters of formula (13)

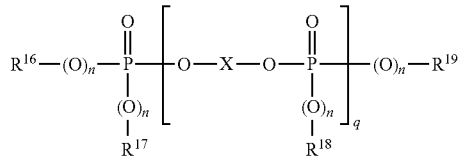

(13)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R_{17}$, $R_{18}$, $R_{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$)alkylene, or aryl groups optionally substituted by $C_{1-4}$ alkyl. Specific aryl moieties are cresyl, phenyl, xylenyl, propylphenyl, or butylphenyl. In some embodiments X in formula (13) is a mono- or poly-nuclear aromatic $C_{6-30}$ moiety derived from a diphenol. Further in formula (13), n is each independently 0 or 1; in some embodiments n is equal to 1. Also in formula (13), q is from 0.5 to 30, from 0.8 to 15, from 1 to 5, or from 1 to 2. Specifically, X can be represented by the following divalent groups (14), or a combination comprising one or more of these divalent groups,

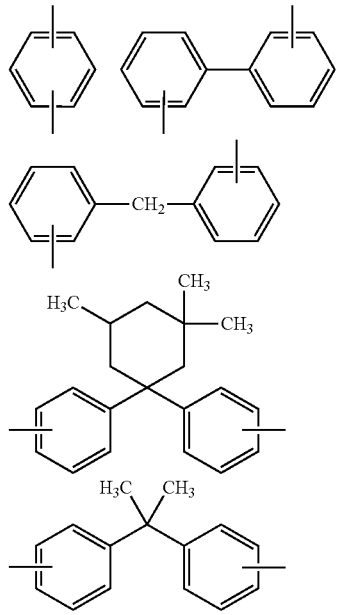

(14)

wherein the monophenylene and bisphenol-A groups can be specifically mentioned.

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, and $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (15)

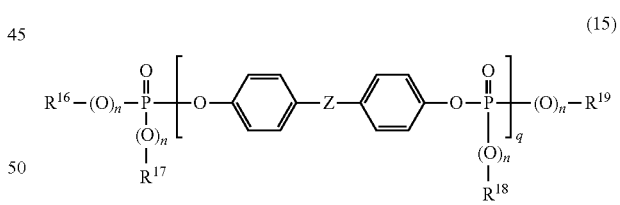

(15)

wherein $R^{16}$, $R^{17}$, $R^{18}$, $R^{19}$, n, and q are as defined for formula (13) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl) phosphine oxide. Phosphazenes (16) and cyclic phosphazenes (17)

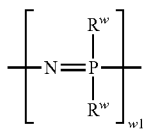

(16)

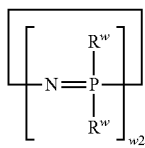

(17)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol-A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the thermoplastic compositions can comprise from 0.3 to 8.5 wt %, or 0.5 to 8.0 wt %, or 3.5 to 7.5 wt % of the organophosphorus flame retardant, each based on the total weight of the composition. Specifically, the organophosphorus compounds can be bisphenol-A bis(diphenyl phosphate), triphenyl phosphate, resorcinol bis(diphenyl phosphate), tricresyl phosphate, or a combination comprising at least one of the foregoing.

The thermoplastic compositions can include various additives ordinarily incorporated into flame retardant compositions having low smoke density and low heat release, with the proviso that the additive(s) are selected so as to not adversely affect the desired properties of the thermoplastic composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and antidrip agents. A combination of additives can be used. In general, the additives are used in the amounts generally known to be effective. The total amount of additives (other than any filler or reinforcing agents) is generally 0.01 to 25 parts per parts per hundred parts by weight of the polymers (PHR).

The use of pigments such as titanium dioxide produces white compositions, which are commercially desirable. Pigments such as titanium dioxide (or other mineral fillers) can be present in the thermoplastic compositions in amounts of 0 to 12 PHR, 0.1 to 9 PHR, 0.5 to 5 PHR, or 0.5 to 3 PHR.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenol)propianate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, and tris-(mixed mono-and di-nonylphenyl)phosphite; phosphonates such as dimethylbenzene phosphonate, phosphates such as trimethyl phosphate; or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis [[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis [[(2-cyano-3,3-diphenylacryloyl)oxy]methyl]propane; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Flame retardant salts are not needed in order to obtain the desired low smoke and heat release characteristics. Flame retardant salts include, for example, salts of $C_{1-16}$ alkyl sulfonate salts such as potassium perfluorobutane sulfonate (Rimar salt), potassium perfluorooctane sulfonate (KSS), tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, inorganic phosphate salts, and fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no or substantially no flame retardant inorganic salts are present in the thermoplastic compositions.

Organic flame retardants can be present, but halogenated flame retardants are generally avoided, such that the thermoplastic composition can be essentially free of chlorine and bromine. "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

Anti-drip agents in most embodiments are not used in the thermoplastic compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the thermoplastic compositions in some embodiments.

In addition to the polycarbonates described above, combinations of the polycarbonate with other thermoplastic polymers, for example combinations of the polycarbonate copolymers with homopolycarbonates, other polycarbonate copolymers, or polyesters, can be used. Useful polyesters can include, for example, poly(alkylene dicarboxylates), liquid crystalline polyesters, and polyester copolymers. The polyesters are generally completely miscible with the polycarbonates when combined. When used, other thermoplastic polymers are present in amounts of less than 20 wt %, less than 10 wt %, or less than 5 wt % of the compositions. In an embodiment, the thermoplastic compositions contain no polymers other than the polycarbonate copolymers described above.

Methods for forming the thermoplastic compositions can vary. In an embodiment, the polymers are combined with any additives (e.g., a mold release agent) such as in a screw-type extruder. The polymers and any additives can be combined in any order, and in any form, for example, powder, granular, filamentous, as a masterbatch, and the like. Transparent compositions can be produced by manipulation of the process used to manufacture the thermoplastic composition. One example of such a process to produce transparent thermoplastic compositions is described in U.S. Pat. No. 7,767,738. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or co-extruded with a coating or other layer) in the form of a sheet and/or can be processed through calendaring rolls to form the desired sheet.

As discussed above, the thermoplastic compositions are formulated to meet strict smoke density and heat release requirements. The relative amounts of the polycarbonate copolymer, in combination with the organophosphorus compound in the thermoplastic compositions depends on the particular copolymer and organophosphorus compound used, the heat release and smoke density, and other desired properties of the thermoplastic composition, such as impact strength, transparency and melt flow. In an embodiment, the organophosphorus compound is present in an amount from 0.5 to 8 wt %, based on the total weight of the thermoplastic composition, and the polycarbonate copolymer is present in an amount of 60 to 99.5 wt %, 65 to 99.5 wt %, 70 to 99.5 wt %, 75 to 99.5 wt %, 80 to 99.5 wt %, 85 to 99.5 wt %, or 90 to 99.5 wt %; and within these ranges, the specific amount of each with any other additives is selected to be effective to provide, in an article made from the compositions, a Ds-4 smoke density of 600 or less determined in accordance with ISO 5659-2 on a 3 mm thick plaque, and a maximum average rate of heat emission (MAHRE) of 160 $kW/m^2$ or less, as determined according to ISO 5660-1 on a 3 mm thick plaque. In an embodiment the polycarbonate copolymer is PPPBP-BPA, comprising first bisphenol-A carbonate repeating units and second PPPBP-derived repeating units, or a poly(carbonate-siloxane)copolymer comprising bisphenol-A carbonate units and siloxane units of formula (9) above. The compositions further comprise an aromatic organophosphorus compound, e.g., RDP, BPADP, or a combination comprising at least one of the foregoing aromatic organophosphorus compounds. The same or similar values can be obtained in articles having a wide range of thicknesses, for example from 0.1 to 10 mm, but particularly at 0.5 to 5 mm.

In addition, the thermoplastic compositions can further have good melt viscosities, which aid processing. The thermoplastic compositions can have a melt volume flow rate (MVR, cc/10 min, according to ISO 1133 of 4 to 30, greater than or equal to 10, greater than or equal to 12, greater than or equal to 15, greater than or equal to 16, greater than or equal to 17, greater than or equal to 18, greater than or equal to 19, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm The same or similar values can be obtained in articles having a wide range of thicknesses, for example from 0.1 to 10 mm, but particularly at 0.5 to 5 mm.

The thermoplastic compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less.

The thermoplastic compositions can further have excellent impact properties, in particular multiaxial impact (MAI) and ductility. The compositions can have an MAI of 100 J or higher, determined at 23° C., 4.4 m/second in accordance with ISO 6603 on discs with a thickness of 3.2 mm. The compositions can have a ductility at 23° C. equal to or higher than 80%. The same or similar values can be obtained in articles having a wide range of thicknesses, for example from 0.1 to 10 mm, but particularly at 0.5 to 5 mm.

The thermoplastic compositions can further be formulated to have a haze less than 3% and a transmission greater than 85%, each determined according to the color space CIE1931 (Illuminant C and a 2° observer) or according to ASTM D 1003 (2007) using illuminant C at a 0.062 inch (1.5 mm) thickness. In some embodiments, the thermoplastic compositions can be formulated such that an article molded from the composition has all three of a haze less of than 15% and a transmission of greater than 75%, each determined according to the color space CIE1931 (Illuminant C and a 2° observer) or according to ASTM D 1003 (2007) using illuminant C at a 0.125 inch (3.2 mm) thickness, and an MAI equal to or higher than 100 J, determined at 23° C. at an impact speed of 4.4 m/second in accordance with ISO 6603 on discs with a thickness of 3.2 mm.

Shaped, foamed, or molded articles comprising the thermoplastic compositions are also provided. The thermoplastic compositions can be molded into useful shaped articles by a variety of means such as injection molding, extrusion, rotational molding, blow molding, and thermoforming to form articles. Thus the thermoplastic compositions can be used to form a foamed article, a molded article, a thermoformed article, an extruded film, an extruded sheet, a layer of a multi-layer article, e.g., a cap-layer, a substrate for a coated article, or a substrate for a metalized article. These values can be obtained in articles having a wide range of thicknesses, for example from 0.1 to 10 mm, or 0.5 to 5 mm.

Illustrative articles include external panels, external transparent cover panels, external equipment housing, and other articles that are not in immediate contact with occupants of the structure where the article is used. Also, access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like.

The thermoplastic compositions provided herein can be formulated to provide articles that meet certain criteria set forth in European Railway standard EN-45545 (2013). The European Union has approved the introduction of a set of fire testing standards for the railroad industry that prescribe certain flammability, flame spread rate, heat release, smoke emission, and smoke toxicity requirements for materials used in railway vehicles, known as European Railway standard EN-45545 (2013). Based on the vehicle type, material, end-use, and fire risks, 26 different "Requirement" categories for qualifying materials have been established (R1-R26).

Passenger seat shells (both back and base shell) fall under the R6 application type. Lighting strips fall under the R3 application type. The R1 application type covers, amongst others, interior vertical and horizontal surfaces, such as side walls, front/end walls, doors, ceiling panels, as well as luggage racks, linings and frames.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (above-ground, easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined. The testing methods, and smoke density and maximum heat release rate values for the various hazard levels in the European Railway standard EN-45545 (2013) are shown in Table 1B for applications qualifying under R6.

TABLE 1B

| European Railways Standard EN-45545 for R6 applications | | |
|---|---|---|
| Hazard Level | Smoke Density, DS-4 ISO 5659-2 | Heat release, MAHRE (kW/m$^2$) ISO 5660-1 |
| HL-1 | ≤600 | — |
| HL-2 | ≤300 | ≤90 |
| HL-3 | ≤150 | ≤60 |

Data in the Examples shows that the compositions herein can be made to meet the requirements for HL-1.

Thus, while thermoplastic compositions can be used for the manufacture of a wide variety of articles, including high occupancy structures such as rail stations, airports and office buildings, the thermoplastic compositions are especially useful for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motorcycle. A "marine vehicle" includes but is not limited to a boat, a ship (including freight and passenger ships), jet skis, and a submarine.

Exemplary transportation components for rolling stock (e.g., trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front-/end-wall doors and external doors, luggage overhead luggage racks, vertical luggage rack, luggage container, luggage compartments, windows, window frames, kitchen interiors, surfaces or a component assembly comprising at least one of the foregoing. In an embodiment any of the foregoing articles are in compliance with R6 of European Rail Standard EN-45545 (2013), for example meeting HL-1.

The thermoplastic compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The poly(siloxane) copolymer compositions can be formed (e.g., molded) into sheets that can be used for any of the above mentioned components. It is generally noted that the overall size, shape, thickness, optical properties, and the like of the polycarbonate sheet can vary depending upon the desired application. In an embodiment any of the foregoing articles are in compliance with R6 of European Rail Standard EN-45545 (2013), for example meeting HL-1.

In an embodiment, provided herein is a thermoplastic composition comprising, based on the total weight of the composition, 90 to 98 wt % of a combination of a (N-phenylphenolphthaleinylbisphenol, 2,2-bis(4-hydro)-bisphenol-A copolymer; and 2 to 10 wt %, or 0.3 to 8.5 wt % of an organophosphorus flame retardant effective to provide 0.1 to 1.0 wt % phosphorus based on the total weight of the composition, specifically BPADP or RDP; and optionally up to 5 wt % of an additive selected from a processing aid, a heat stabilizer, an ultra violet light absorber, a colorant, or a combination comprising at least one of the foregoing, wherein the component has a smoke density value of equal to or less than 600 determined according to ISO 5659-2 on a 3 mm thick plaque, and a material heat release of less than 160 kW/m$^2$ determined according to ISO 5660-1, on a 3 mm thick plaque, and optionally, a 3.3-millimeter sample molded from the composition has a multiaxial impact of greater than 110 measured at 23° C., 4.4 m/sec in accordance with ISO 6603. The same or similar values can be obtained in components having a wide range of thicknesses, for example from 0.1 to 10 mm, or 0.5 to 5 mm. These thermoplastic compositions are especially useful in the manufacture of a transportation component, in particular a train component.

In another embodiment a thermoplastic composition comprises, based on the total weight of the composition, based on the total weight of the composition, 2 to 10 wt %, or 0.3 to 8.5 wt % of an organophosphorus compound effective to provide 0.1 to 1.0 wt % phosphorus based on the total weight of the composition, specifically BPADP or RDP; 90 to 98 wt % of a poly(carbonate-siloxane) copolymer; and optionally up to 5 wt % of an additive selected from a processing aid, a heat stabilizer, an ultra violet light absorber, a colorant, or a combination comprising at least one of the foregoing, wherein the component has a smoke density value of equal to or less than 600 determined according to ISO 5659-2 on a 3 mm thick plaque, and a material heat release of less than 160 kW/m$^2$ determined according to ISO 5660-1 on a 3 mm thick plaque. The same or similar values can be obtained in components having a wide range of thicknesses, for example from 0.1 to 10 mm, or 0.5 to 5 mm. These thermoplastic compositions are especially useful in the manufacture of a transportation component, in particular a train component.

The thermoplastic compositions having low heat release rates determined according to ISO 5660-1 and low smoke densities determined according to ISO 5659-2 are further illustrated by the following non-limiting examples.

EXAMPLES

Materials for the following examples are listed in Table 2. Amounts of each component in the Examples are in wt % unless otherwise indicated.

TABLE 2

| Component | Trade name; chemical description | Source |
|---|---|---|
| PPPBP-BPA | N-phenylphenolphthaleinylbisphenol, 2,2-bis(4-hydro))-bisphenol-A copolymer, 32 mol % PPPBP, Mw = 23,000 to 27,000 g/mol (determined via GPC using polycarbonate standards), manufactured by interfacial polymerization | SABIC INNOVATIVE PLASTICS |
| BPA-PC | Bisphenol-A polycarbonate, manufactured by interfacial polymerization, Mw = 28,000 to 32,000 g/mol (determined via GPC using polycarbonate standards) | SABIC INNOVATIVE PLASTICS |
| PC-Siloxane | PDMS (polydimethylsiloxane)-bisphenol-A copolymer, 6 mol wt % siloxane having an average block length of 40-50 units, Mw 21,000 t-25,0000 g/mol (determined via GPC using polycarbonate standards), manufactured by interfacial polymerization | SABIC INNOVATIVE PLASTICS |
| BPADP | CR-741; Bisphenol-A diphosphate | Nagase (Europa) GmbH |
| RDP | FyrfolEX; Tetraphenyl resorcinol diphosphate | ICL-IP Europe |
| BC52 | Phenoxy-terminated carbonate oligomer of tetrabromobisphenol-A | Various |
| Boron phosphate | Boron orthophosphate | Budenheim |
| Polyphosphate | Songflame TP100; Phenol/Bi-phenol polyphosphate | Songwon Industrial Co. |
| AO | IRGAPHOS 168; Tris(2,4-di-tert-butylphenyl) phosphite | Ciba |

The tests performed are summarized in Table 3.

TABLE 3

| Description | Test | Specimen | Property | Units |
|---|---|---|---|---|
| Smoke density | ISO 5659-2 | plaque 75 × 75 × 3 mm | Ds-4 | [—] |
| Heat release | ISO 5660-1 | plaque 100 × 100 × 3 mm | MAHRE | kW/m$^2$ |

ISO smoke density measurements were performed on 7.5× 7.5 cm plaques with 3 mm thickness using an NBS Smoke Density Chamber from Fire Testing Technology Ltd (West Sussex, United Kingdom). All measurements were performed according to ISO 5659-2, with an irradiance of 50 kW/m$^2$ at the sample position and a sample-to-cone distance of 5 cm in view of the charring behavior of the samples (as prescribed by ISO 5659-2). Ds-4 was determined as the measured smoke density after 240 seconds.

ISO heat release measurements were performed on 10×10 cm plaques with 3 mm thickness using a Cone calorimeter. All measurements were performed according to ISO 5660-1, with an irradiation of 50 kW/m$^2$ at the sample position and a sample-to-cone distance of 6 cm in view of the charring behavior of the samples (in accordance with ISO 5660-1). Heat release is measured as MAHRE in kW/m$^2$.

The smoke density and heat release tests executed are indicative tests. They were performed according to their respective ISO standards, but were not executed by an officially certified test institute.

Extrusion and Molding Conditions.

The compositions were made as follows. All solid additives (stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP, RDP) were fed before the vacuum using a liquid injection system. It will be recognized by one skilled in the art that the method is not limited to these temperatures or processing equipment.

Extrusion of all materials was performed on a 27 mm Werner-Pfleiderer ZAK twin-screw extruder (L/D ratio of 33:1) with a vacuum port located near the die face. The extruder has 9 zones, which were set at temperatures of 40° C. (feed zone), 200° C. (zone 1), 250° C. (zone 2), and 270° C. (zone 3) and 280-300° C. zone 4 to 8. Screw speed was 300 rpm and throughput was between 15 and 25 kg/hr.

The compositions were molded after drying at 100-110° C. for 6 hrs. on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Examples 1-9

Examples 1-9 demonstrate the effect of adding different organophosphorus flame retardants (BPADP, RDP, and a phenol/biphenol polyphosphate) to a polycarbonate copolymer, namely PPPBP-BPA. Formulations and results are shown in Table 4.

density of 460 (Ds-4) as measured according to ISO5659-1 and MAHRE of 171 kW/m$^2$ for BPADP providing 0.67% phosphorus (Ex2).

Conversely, the addition of brominated polycarbonate (CEx7) resulted in deterioration of Ds-4 smoke density, yielding the maximum Ds-4 value of 1320 at 3 mm thickness. The same trend is observed for a brominated oligomer (CEx8), which also gives a higher smoke density, with Ds-4 values increasing by about 17% from 626 to 732 at 3 mm thickness (CEx5 vs. CEx7).

Addition of an inorganic phosphorus source (boron phosphate) had no positive effect on smoke density or heat release (CEx9), with Ds-4 of 648 and MAHRE of 195 (CEx9) compared to Ds-4 of 626 and MAHRE of 198 for the composition without a phosphorus component (CEx6), all measured on 3 mm thick plaques.

These results demonstrate that the effect of adding compounds having inherent flame retardant characteristics to polycarbonate copolymers do not automatically result in an improvement in smoke density and/or MAHRE or that any improvement would be to the same degree. All organophosphorus additives (RDP, BPADP, TP100) had positive effects on smoke density (Ds-4) measured according to ISO 5659-2 and heat release (MAHRE) measured according to ISO 5660-1, whereas other common flame retardants such as brominated additives or an inorganic phosphorus additive have negative effects or no positive effect, respectively.

TABLE 4

| | Ex 1 | Ex 2 | Ex 3 | Ex 4 | Ex 5 | CEx 6 | CEx 7 | CEx 8 | CEx 9 |
|---|---|---|---|---|---|---|---|---|---|
| Component, wt % | | | | | | | | | |
| PPPBP-BPA | 96.17 | 92.42 | 96.49 | 96.17 | 92.42 | 99.92 | 82.34 | 89.92 | 98.77 |
| AO | 0.08 | 0.08 | 0.08 | 0.08 | 0.08 | 0.08 | 0.08 | 0.08 | 0.08 |
| PC-Br | 0 | 0 | 0 | 0 | 0 | 0 | 17.6 | 0 | 0 |
| RDP | 0 | 0 | 0 | 3.75 | 7.5 | 0 | 0 | 0 | 0 |
| BC52 | 0 | 0 | 0 | 0 | 0 | 0 | 0 | 10 | 0 |
| BPADP | 3.75 | 7.5 | 0 | 0 | 0 | 0 | 0 | 0 | 0 |
| Boron phosphate | 0 | 0 | 0 | 0 | 0 | 0 | 0 | 0 | 1.15 |
| TP100 | 0 | 0 | 3.43 | 0 | 0 | 0 | 0 | 0 | 0 |
| P-content | 0.33 | 0.67 | | 0.37 | 0.82 | 0 | 0 | 0 | 0 |
| Property | | | | | | | | | |
| Ds-4 ISO 5659-2 | 571 | 460 | 580 | 424 | 399 | 626 | 1320 | 732 | 648 |
| MAHRE ISO 5660-1 | 165 | 171 | 173 | 147 | 139 | 198 | — | — | 195 |

The results in Table 4 demonstrate that addition of the organophosphorus flame retardants to PPPBP-BPA copolymers (Ex1-5) results in improved smoke density (Ds-4) as measured according to ISO5659-2 on 3 mm thick plaques, as well as maximum average rate of heat emission values (MAHRE) as measured according to ISO5660-1 on 3 mm thick plaques compared to the copolymer without an organophosphorus flame retardant (CEx6).

The effect of addition of RDP was very similar to BPADP; as indicated above, the smoke density (Ds-4) is improved compared to the PPPBP-BPA copolymer without the organophosphorus flame retardants (BPADP or RDP) (Ex4-5 vs. CEx6). Although the addition of all of the organophosphorus flame retardants result in improved smoke density and MAHRE (Ex1-5) compared to the copolymer without an organophosphorus flame retardant (CEx6), RDP appears to be most effective. Addition of RDP decreased smoke density (Ds-4) to 424 and MAHRE to 147 kW/m$^2$ (Ex4) while providing 0.37% phosphorus content, compared with the smoke Examples 10-13

Examples 10-13 demonstrate the effect of adding an organophosphorus flame retardants (BPADP) to poly(carbonate-siloxane) copolymers. Formulations and results are shown in Table 5.

TABLE 5

| Component, wt % | Ex 10 | CEx 11 | CEx 12 | CEx 13 |
|---|---|---|---|---|
| PC | 0 | 0 | 92.5 | 100 |
| PC—Si | 92.5 | 100 | 0 | 0 |
| BPADP | 7.5 | 0 | 7.5 | 0 |
| P-content | 0.67 | 0 | 0.67 | 0 |
| Property | | | | |
| Ds-4 | 610 | 935 | 1320 | 1320 |
| MAHRE | 153 | 220 | 211 | 236 |

The results in Table 5, demonstrate that addition of BPADP to PC-Si greatly improves the smoke density (Ds-4) measured according to ISO 5659-2 and heat release (MAHRE) measured according to ISO 5660-1 of the copolymer. Addition of 7.5 wt % of an organophosphorus compound (BPADP, Ex10) to PC-Si resulted in a reduction in the observed Ds-4 smoke density, measured according to ISO 5659-2 on a 3 mm thick plaque, reducing the value from 935 (CEx11) to 610. The addition of BPADP effectively transforms PC-Si from a material that would not otherwise meet the European Railway standard EN-45545 for HL-1 (Ds-4≤600) to a material that can meet these requirements upon optimization of the composition (Ds-4 value of 610 for Ex10 at 3 mm thickness).

The same effect is not observed when an aromatic organophosphorus compound is added to a polycarbonate bisphenol-A homopolymer (CEx12 and CEx13). These results indicate that the effect of adding an organophosphorus compound, in particular an aromatic organophosphorus compound to polycarbonate copolymers on heat release (MAHRE) and smoke density (Ds-4) does not occur with all polycarbonates, and instead is polymer/copolymer specific.

Based on the relatively higher effectiveness observed for in the case of PPPBP-PC (Ex4 and Ex5) compared to BPADP (Ex1 and Ex2), the addition of RDP in an amount effective to provide 0.67 wt % of phosphorus can potentially reduce smoke density (Ds-4) to below 600, measured according to ISO 5659-2 on 3 mm thick plaques.

The singular forms "a," "an," and "the" include plural referents unless the context clearly dictates otherwise. "Or" means "and/or." In general, the embodiments can comprise, consist of, or consist essentially of, any appropriate components herein disclosed. The embodiments can additionally, or alternatively, be formulated so as to be devoid, or substantially free, of any components, materials, ingredients, adjuvants or species used in the prior art compositions or that are otherwise not necessary to the achievement of the function and/or objectives as described herein. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.).

Unless defined otherwise, technical and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the term "hydrocarbyl" refers broadly to a substituent comprising carbon and hydrogen, optionally with 1 to 3 heteroatoms, for example, oxygen, nitrogen, halogen, silicon, or sulfur; "alkyl" means a straight or branched chain monovalent hydrocarbon group; "alkylene" means a straight or branched chain divalent hydrocarbon group; "alkylidene" means a straight or branched chain divalent hydrocarbon group, with both valences on a single common carbon atom; "alkenyl" means a straight or branched chain monovalent hydrocarbon group having at least two carbons joined by a carbon-carbon double bond; "cycloalkyl" means a non-aromatic monovalent monocyclic or multicyclic hydrocarbon group having at least three carbon atoms, "cycloalkenyl" means a non-aromatic cyclic divalent hydrocarbon group having at least three carbon atoms, with at least one degree of unsaturation; "aryl" means an aromatic monovalent group containing only carbon in the aromatic ring or rings; "arylene" means an aromatic divalent group containing only carbon in the aromatic ring or rings; "alkylaryl" means an aryl group that has been substituted with an alkyl group as defined above, with 4-methylphenyl being an exemplary alkylaryl group; "arylalkyl" means an alkyl group that has been substituted with an aryl group as defined above, with benzyl being an exemplary arylalkyl group; "alkoxy" means an alkyl group as defined above with the indicated number of carbon atoms attached through an oxygen bridge (—O—); and "aryloxy" means an aryl group as defined above with the indicated number of carbon atoms attached through an oxygen bridge (—O—).

Unless otherwise indicated, the groups herein can be substituted or unsubstituted. "Substituted" means a groups substituted with at least one (e.g., 1, 2, or 3) substituents independently selected from a halide (e.g., F$^-$, Cl$^-$, Br$^-$, I$^-$), a $C_{1-6}$ alkoxy, a nitro, a cyano, a carbonyl, a $C_{1-6}$ alkoxycarbonyl, a $C_{1-6}$ alkyl, a $C_{2-6}$ alkynyl, a $C_{6-12}$ aryl, a $C_{7-13}$ arylalkyl, a $C_{1-6}$ heteroalkyl, a $C_{3-6}$ heteroaryl (i.e., a group that comprises at least one aromatic ring and the indicated number of carbon atoms, wherein at least one ring member is S, N, O, P, or a combination thereof), a $C_{3-6}$ heteroaryl($C_{3-6}$)alkyl, a $C_{3-8}$ cycloalkyl, a $C_{5-8}$ cycloalkenyl, a $C_{5-6}$ heterocycloalkyl (i.e., a group that comprises at least one aliphatic ring and the indicated number of carbon atoms, wherein at least one ring member is S, N, O, P, or a combination thereof), or a combination including at least one of the foregoing, instead of hydrogen, provided that the substituted atom's normal valence is not exceeded.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising
    a polycarbonate copolymer comprising first repeating units and second repeating units, wherein the first repeating units are first carbonate units and the second repeating units are second carbonate units that are different from the first carbonate units; and
    an organophosphorus compound in an amount effective to provide 0.1-1 wt % phosphorus, based on the total weight of the polycarbonates in the composition;
    wherein an article molded from the composition has
        a smoke density after 4 minutes (Ds-4) of equal to or less than 600 as determined according to ISO 5659-2 on a 3 mm thick plaque,
        a maximum average rate of heat emission (MAHRE) of less than or equal to 160 kW/m$^2$ as determined according to ISO 5660-1 on a 3 mm thick plaque, and
        a multiaxial impact energy equal to or higher than 100 J as determined according to ISO 6603 on a 3.2 mm thick disc, wherein the first carbonate units are of the formula

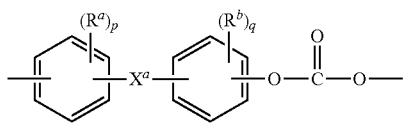

wherein
R$^a$ and R$^b$ are each independently a C$_{1-12}$ alkyl group,
p and q are each independently integers of 0 to 4, and
X$^a$ is a single bond, —O—, —S—, —S(O)—, —S(O)$_2$—, —C(O)—, a C$_{1-12}$ alkylidene of formula —C(R$^c$)(R$^d$)— wherein R$^c$ and R$^d$ are each independently hydrogen or C$_{1-11}$ alkyl, or a group of the formula —C(=R$^e$)— wherein R$^e$ is a divalent C$_{1-11}$ hydrocarbon group, and
wherein the second carbonate units are of the formula

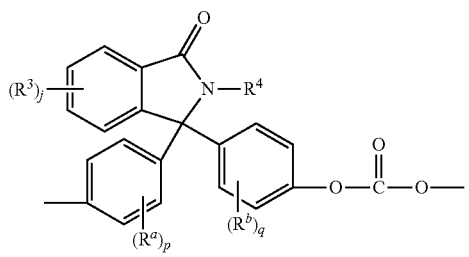

wherein
R$^a$ and R$^b$ are each independently a C$_{1-3}$ alkyl group,
p and q are each independently integers of 0 to 4,
R$^3$ is each independently a C$_{1-6}$ alkyl group,
j is 0 to 4, and
R$_4$ is hydrogen, C$_{1-6}$ alkyl, or phenyl optionally substituted with 1 to 5 C$_{1-6}$ alkyl groups.

2. The composition of claim 1, wherein the first repeating units are bisphenol-A carbonate units.

3. The composition of claim 1, wherein, the second repeating units are carbonate units of the formula

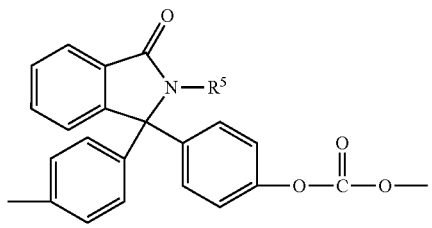

wherein R$^5$ is hydrogen, C$_{1-6}$ alkyl, or phenyl optionally substituted with 1 to 5 C$_{1-6}$ alkyl groups.

4. The composition of claim 3, wherein R$^5$ is phenyl.

5. The composition of claim 1, wherein the organophosphorus compound is an aromatic organophosphorus compounds having at least one organic aromatic group and at least one phosphorus-containing group, or an organic compounds having at least one phosphorus-nitrogen bond.

6. The composition of claim 5, wherein the aromatic organophosphorus compound comprises a C$_{3-30}$ aromatic group and a phosphate group, phosphite group, phosphonate group, phosphinate group, phosphine oxide group, phosphine group, phosphazene, or a combination comprising at least one of the foregoing phosphorus-containing groups.

7. The composition of claim 6, wherein the aromatic organophosphorus compound is of the formula

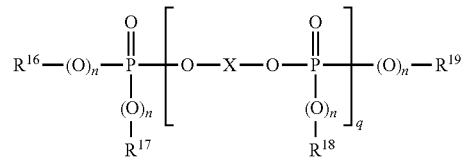

wherein
R$^{16}$, R$^{17}$, R$^{18}$ and R$^{19}$ are each independently C$_{1-8}$ alkyl, C$_{5-6}$ cycloalkyl, C$_{6-20}$ aryl, or C$_{7-12}$ arylalkylene, each optionally substituted by C$_{1-12}$ alkyl, and
X is a mono- or poly-nuclear aromatic C$_{6-30}$ moiety or a linear or branched C$_{2-30}$ aliphatic radical, which can be OH-substituted and can contain up to 8 ether bonds, provided that at least one of R$^{16}$, R$^{17}$, R$^{18}$, R$^{19}$, and X is aromatic,
n is each independently 0 or 1, and
q is from 0.5 to 30.

8. The composition of claim 7, wherein
each of R$^{16}$, R$^{17}$, R$^{18}$, and R$^{19}$ is phenyl,
X is of the formula

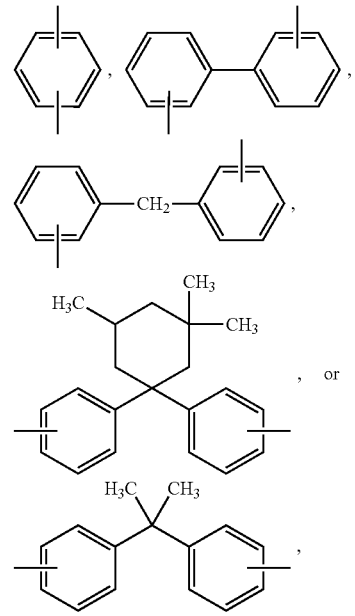

each n is 1, and
p is 1 to 5.

9. The composition of claim 5, wherein the aromatic organophosphorus compound is bisphenol-A bis(diphenyl phosphate), triphenyl phosphate, resorcinol bis(diphenyl phosphate), tricresyl phosphate, or a combination comprising at least one of the foregoing.

10. The composition of claim 5, wherein the organophosphorus compound containing a nitrogen-phosphorus bond is a phosphazene, phosphorus ester amide, phosphoric acid amide, phosphonic acid amide, phosphinic acid amide, tris (aziridinyl) phosphine oxide, a combination comprising at least one of the foregoing.

11. The composition of claim 5, wherein the organophosphorus compound is present in an amount effective to provide 0.3% to 0.85% of phosphorus, based on the weight of the composition.

12. The composition of claim 1, further comprising a processing aid, a heat stabilizer, an antioxidant, an ultra violet light absorber, a colorant, or a combination comprising at least one of the foregoing in a total amount of 0.1 to 5 wt %, based on the weight of the composition.

13. The composition of claim 1, wherein no or substantially no flame retarding brominated compounds, flame retardant salts, or a combination comprising at least one of the foregoing are present in the composition.

14. The composition of claim 13, wherein the brominated compound is a brominated polycarbonate, and the flame retardant salt is potassium perfluorobutane sulfonate, potassium perfluorooctane sulfonate, tetraethylammonium perfluorohexane sulfonate, potassium diphenylsulfone sulfonate, $Na_2CO_3$, $K_2CO_3$, $MgCO_3$, $CaCO_3$, and $BaCO_3$, an inorganic phosphate salt, $Li_3AlF_6$, $BaSiF_6$, $KBF_4$, $K_3AlF_6$, $KAlF_4$, $K_2SiF_6$, $Na_3AlF_6$, or a combination comprising at least one of the foregoing.

15. The composition of claim 13, wherein no or substantially no brominated polycarbonate, boron phosphate, or $C_{1-6}$ alkyl sulfonate salt is present in the composition.

16. The composition of claim 1, having a transparency of more than 85% and a haze of less than 3%, each measured according to ASTM D 1003 (2007) using illuminant C on plaques with 3 mm thickness.

17. The composition of claim 1, having a melt volume flow rate greater than or equal to 10 cc/10 min, determined according to ISO 1133.

18. The composition of claim 1, having an MAI of 100 J or higher, determined at 23° C., 4.4 m/second in accordance with ISO 6603 on discs with a thickness of 3.2 mm.

19. An article comprising the composition of claim 1, wherein the article is a molded article, a thermoformed article, an extruded film, an extruded sheet, a foamed article, a layer of a multi-layer article, a substrate for a coated article, or a substrate for a metallized article.

20. The article of claim 19, having a thickness of 0.1 to 10 mm.

21. The article of claim 19, having a thickness of 0.5 to 5 mm.

22. The article of claim 19, wherein the article is a transportation component.

23. The article of claim 22, selected from a train or aircraft interior component, wherein the component is a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

24. A method of manufacture of an article, comprising molding, extruding, foaming, or casting the composition of claim 1.

25. The thermoplastic composition of claim 1 comprising a polycarbonate copolymer comprising bisphenol-A carbonate units and carbonate units of the formula

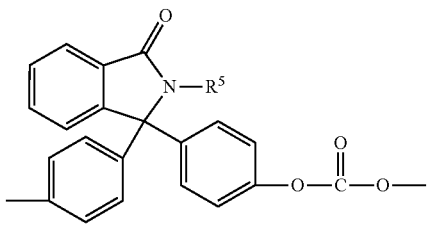

wherein $R^5$ is hydrogen, $C_{1-6}$ alkyl, or phenyl optionally substituted with 1 to 5 $C_{1-6}$ alkyl groups; and an organophosphorus compound in an amount effective to provide 0.1-1 wt % phosphorus, based on the total weight of the polycarbonate in the composition;

wherein an article molded from the composition has
a smoke density after 4 minutes (Ds-4) of equal to or less than 600 as determined according to ISO 5659-2 on a 3 mm thick plaque,
a maximum average rate of heat emission (MAHRE) of less than or equal to 160 $kW/m^2$ as determined according to ISO 5660-1 on a 3 mm thick plaque, and
a multiaxial impact energy equal to or higher than 100 J as determined according to ISO 6603 on a 3.2 mm thick disc.

* * * * *